Oct. 28, 1952 J. E. HUSKEY 2,615,607
BATTERY FILLER
Filed Feb. 14, 1950

INVENTOR.
JOSEPH E HUSKEY,
BY
McMorrow, Berman & Davidson
ATTORNEYS.

Patented Oct. 28, 1952

2,615,607

UNITED STATES PATENT OFFICE 2,615,607

BATTERY FILLER

Joseph E. Huskey, Newport, Tenn.

Application February 14, 1950, Serial No. 144,129

1 Claim. (Cl. 226—19)

1

This invention relates to battery fillers, and more particularly to a filler for adding water to a wet cell storage battery.

It is among the objects of the invention to provide an improved battery filler which will raise the liquid level in a battery cell to a predetermined level above the battery plates and will avoid overfilling the battery and spilling the water or electrolyte, which will not rob the battery of any electrolyte or mix electrolyte with the water in the filler, which is adjustable to vary the level of the battery liquid above the battery plates, and which is simple and durable in construction, economical to manufacture, positive in operation and easy to use.

Other objects and advantages will become apparent from a consideration of the following description and the appended claim in conjunction with the accompanying drawing wherein:

Figure 1:
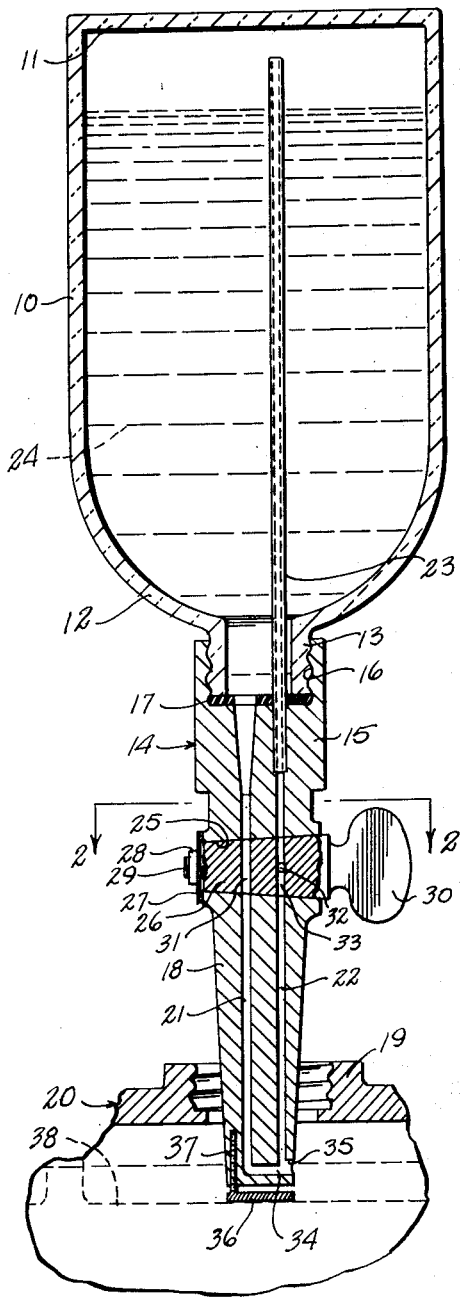
Figure 1 is a longitudinal medial cross section of a battery filler illustrative of the invention showing the filler in operative association with a battery cell for filling the latter.
Figure 2:
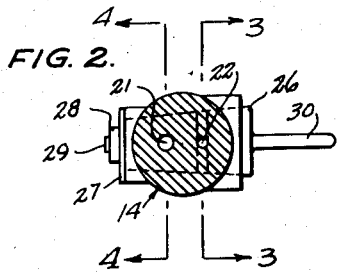
Figure 2 is a transverse cross sectional view on the line 2—2 of Figure 1.

With continued reference to the drawing, the filler comprises a hollow container 10 which is preferably somewhat elongated in order to facilitate the handling of the filler and has a flat end wall 11 and a domed end wall 12. The domed end wall 12 is provided, substantially at its center, with an opening surrounded by an externally protruding boss or neck 13 having external screw threads thereon.

An elongated spout, generally indicated at 14, is connected at one end to the neck 13 and extends outwardly from the container 10. This spout has at one end an enlarged, preferably cylindrical portion 15 provided in its end with an internally screw threaded socket 16 which receives the externally screw threaded neck 13 of the container, a flat gasket 17 being interposed between the end of the neck 13 and the bottom of the socket 16 to provide a fluid tight joint between the container and the spout. Outwardly of the enlarged portion 15 the spout comprises a tapering portion 18 of reduced cross sectional area or diameter the smaller end of which is of a size to pass easily through the cap boss 19 of a battery cell, generally indicated at 20.

Two bores 21 and 22 extend longitudinally through the spout 14 in spaced apart, substantially parallel relationship to each other, the bore 21 being somewhat larger in cross sectional area than the bore 22. Both of these bores extend to the bottom of the socket 16 and communicate with the interior of the container 10. A tube 23 is inserted at one end into a counterbore provided in the bore 22 at the socket end of this bore and this tube extends through the container to a location adjacent the flat bottom wall 11 for the purpose of admitting air into the upper portion of the container above the battery liquid, such as distilled water 24 in the container.

A tapered valve aperture 25 extends transversely through the spout 14 intermediate the length thereof and intersects both of the bores 21 and 22. A tapered valve plug 26 is rotatably mounted in the aperture 25 and held in seated engagement with the aperture by suitable means, such as the spring washer 27 overlying the smaller end of the plug and marginally engaging the spout around the smaller end of the valve aperture and a nut 28 threaded onto a screw 29 projecting from the smaller end of the plug 26 and bearing on the outer side of the spring washer 27.

Figure 4:
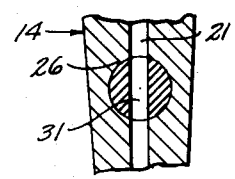
Figure 4 is a cross sectional view on the line 4—4 of Figure 2 with the valve in the same position as that illustrated in Figure 3.
Figure 6:
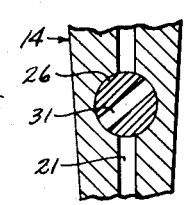
Figure 6 is a cross sectional view similar to Figure 4 with the valve in the operative position shown in Figure 5.
Figure 7:
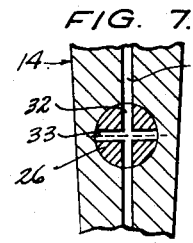
Figure 7 is a cross sectional view similar to Figure 3 with the valve in an operative position different from the positions illustrated in Figures 3 and 5.

The plug 26 is provided at its larger end with a turning handle 30 and is provided intermediate its length with a transverse aperture or passage 31 which registers with the bore 21 when the valve plug is in the rotational position relative to the spout 14 illustrated in Figures 1 and 4. When the plug is in this rotational position the transverse aperture 31 provides a continuation of the bore 21 through the plug receiving aperture 25, but when the plug is in a different rotational position, as illustrated in Figure 6, the bore 21 is interrupted by the valve plug.

Figure 3:
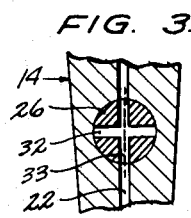
Figure 3 is a longitudinal cross sectional view of a fragmentary portion of the filler spout taken on the line 3—3 of Figure 2 with the valve in a predetermined operative position.
Figure 5:
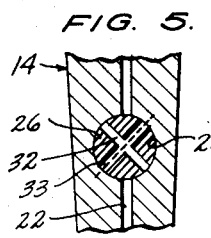
Figure 5 is a cross sectional view similar to Figure 3 with the valve in a different operative position from that illustrated in Figure 3.
Figure 8:
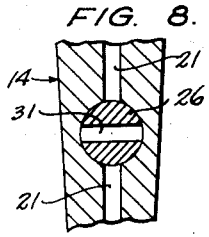
Figure 8 is a cross sectional view similar to Figure 4 with the valve in the operative position illustrated in Figure 7.

At the location of the bore 22 the valve plug is provided with two transverse apertures or passages 32 and 33 which are preferably disposed substantially perpendicular to each other and intersect at the center of the plug. With the valve plug in the rotational position relative to the spout, as illustrated in Figures 1 and 3, the transverse aperture 33 provides a continuation of the bore 22 through the valve plug while the aperture 32 is out of registry with the bore 22. At a rotational position of the valve plug substantially 90 degrees from that illustrated in Figures 1 and 3 the bore 32 provides a continuation for the bore 22, the bore 21 being at this time interrupted, as illustrated in Figure 8. At other rotational positions of the valve plug relative to the spout 14 both of the bores 21 and 22 are interrupted as illustrated in Figures 5 and 6.

The two bores 21 and 22 extend to a location near the smaller end of the spout 14 or the end of the spout remote from the container 10 and at this location an aperture or passage 34 extends transversely of the spout and intersects both of the bores 21 and 22. This passage 34 opens at one end to the surface of the spout adjacent the bore 22 and extends transversely of the spout to the bore 21 but does not extend beyond the bore 21. The portion of the aperture 34 between the bore 22 and the open end of the aperture is made larger than the remainder of the aperture, as indicated at 35, for a purpose which will presently appear.

A foot 36 in the form of a flat plate which is preferably of circular shape, is spaced from the smaller end of the spout 14 and adjustably secured to the spout by a screw threaded shank 37 which is secured at one end to the foot plate 36 near the edge of the latter and is threaded into a screw threaded well which extends inwardly from the smaller end of the spout 14.

In using the battery filler the plate 36 is adjusted relative to the spout so that the distance between the outer surface of this plate and the side of the enlarged end portion 35 of the aperture 34 remote from the plate will be equal to the distance that the fluid level in the battery cell to be filled is above the upper ends of the battery plates 38. With water in the container 10 and with the valve plug 26 rotated to a position at which both of the bores 21 and 22 are closed, the outer or distal end of the spout 14 is inserted through the opening in the battery cap boss 19 and the foot 36 brought to rest on the upper ends of the battery plates. The valve plug 26 is then rotated by means of the handle 30 to a position at which both of the bores 21 and 22 extend continuously through the valve plug and, if the level of the electrolyte in the battery cell is below the predetermined level, liquid will flow from the container 10 through the bore 21 into the battery cell. At the same time, air from the space in the cell above the level of the electrolyte will flow through the enlarged end portion 35 of the aperture 34 into the lower end of the bore 22 and upwardly through this bore and the tube 23 to replace the liquid, such as distilled water, flowing from the container into the battery cell. As soon as the liquid level in the battery cell reaches the upper side of the enlarged end portion of the aperture 34 the flow of air into the open end of this aperture will be cut off and water from the bore 21 and aperture 34 will then flow upwardly in the bore 22 until the pressure in the two bores 21 and 22 is balanced and further flow of water from the bore 21 into the battery cell is discontinued. The valve plug 26 is then rotated to a position in which both of the bores 21 and 22 are interrupted and the spout is removed from the battery cell.

Before the battery filler can again be used the water must be discharged from the bore 22. In order to accomplish this the valve plug is turned to a position such that the bore 22 is continued through the valve plug by the aperture 32 while the bore 21 remains interrupted. By shaking the filler or inverting it, the water will be discharged from the bore 22 and the valve plug is then turned to a position closing both of the bores 21 and 22. The battery filler is now ready for further use.

With this arrangement the flow of water into the battery cell is terminated as soon as the liquid level in the cell has reached the predetermined height, the cell is not robbed of electrolyte and no electrolyte, such as battery acid, is drawn into the filler and neither the water nor the electrolyte is spilled during the operation of filling the battery cells.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A battery filler comprising a container having a neck, an elongated spout detachably secured at one end to said container and removable from the container for filling the latter and having two independent bores extending longitudinally thereof, each of said bores communicating at one end with the interior of said container, a tube extending from the container end of one of said bores into said container to a location adjacent the other end of the latter, said spout also having adjacent its end remote from said container a transverse aperture opening at one end to the side surface of said spout and connected to both of said bores with an enlarged portion at its open end and said spout having intermediate its length a transversely extending valve bore, a manually rotatable valve plug disposed in said valve bore and having apertures extending transversely therethrough for continuing said longitudinal bores when said valve plug is in a predetermined rotational position relative to said spout, the transverse apertures in said valve plug being so arranged that both of said bores can be continued, both can be interrupted, or one bore can be continued while the other is interrupted at different rotational positions of said plug relative to said spout, a footplate spaced from the end of said spout opposite said container and adapted to rest upon the upper ends of the plates of a battery cell to space the open end of said aperture a predetermined distance above the upper ends of the plates, and a screw adjustably connecting said footplate to said spout.

JOSEPH E. HUSKEY.

REFERENCES CITED

The following references are of record in the file of this patent:

UNITED STATES PATENTS

| Number | Name | Date |
| --- | --- | --- |
| 1,216,786 | Eaken | Feb. 20, 1917 |
| 2,360,565 | Kerr | Oct. 17, 1944 |